UNITED STATES PATENT OFFICE.

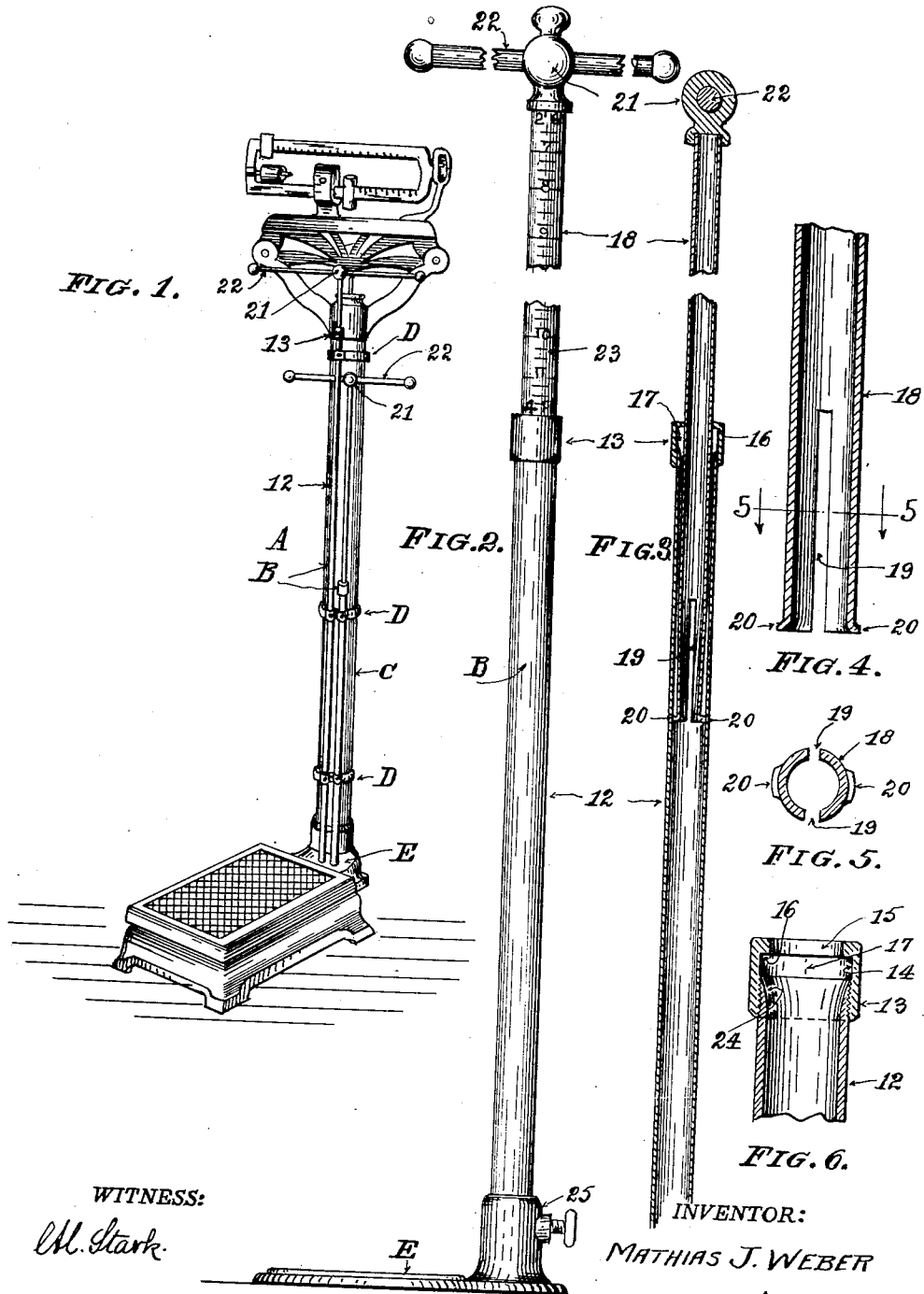

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

MEASURING DEVICE.

1,371,281.  Specification of Letters Patent.  Patented Mar. 15, 1921.

Application filed November 7, 1919. Serial No. 336,252.

*To all whom it may concern:*

Be it known that I, MATHIAS J. WEBER, a citizen of the United States, and resident of the city of Chicago, in the county of Cook and State of Illinois, have invented certain new and useful Improvements in Measuring Devices; and I do hereby declare that the following description of my invention, taken in connection with the accompanying sheet of drawings, forms a full, clear, and exact specification, which will enables others skilled in the art to which the said invention appertains to make and use the same.

This invention has general reference to measuring rods for ascertaining the height of persons; and it is more especially designed as an attachment to physicians' and bath-scales to measure the height of persons in connection with taking their weight, while stripped of clothing. It consists, essentially, of a tubular rod or casing suitably secured to a base or standard, within which casing a graduated rod is telescopingly arranged, the latter rod being provided with marks, or indicia to indicate height, generally of the U. S. standard scale of inches or of the metric system, all as hereinafter first fully set forth and described, and then pointed out in the claims.

In the drawings which serve to illustrate this invention very fully and form a part of this specification—

Figure 1 is a perspective view of a physician's platform weighing scales to which my improved measuring device is shown attached. Fig. 2 is an elevation of the measuring device detached, and shown provided with a base for general use. Fig. 3 is a longitudinal sectional elevation of the device. Fig. 4 is a sectional view of the slidable member of this device and showing the lower end thereof. Fig. 5 is a transverse sectional view on line 5—5 of Fig. 4. Fig. 6 is a sectional view of the upper end of the fixed tubular rod or casing.

Like parts are designated by the same characters and symbols of reference in all the figures.

A, in Fig. 1, designates the usual platform weighing scales; and B, the measuring device attached, as shown, to the standard C, of these scales, by clamps or other suitable means D. This measuring device is comprised of a tubular rod 12, of suitable diameter and length, there being at the upper end of this rod a fixed socket 13, either sweated thereto or in screw-threaded engagement therewith. This socket has a bore 14, to receive the tubular rod, and a smaller bore 15, of a diameter approximately equal to the internal diameter of the tube 12, thereby affording a shoulder 16, in said socket and a recess 17, the object of which will hereinafter appear. In this tubular rod 12 is slidably arranged a second, preferably tubular, rod 18, which second rod may telescope into the outer tube 12. The lower end of this second rod 18 is longitudinally slitted, as at 19, and this lower end has its terminal slightly outwardly bent, as at 20, to afford a stop, which prevents the slidable rod from being entirely withdrawn from the outer tube when being outwardly pulled. This slitting of the slidable rod renders the lower end of the rod 18 resilient, and in order that this latter rod may be retained in any position within the outer tube by frictional contact, this lower end is slightly spread so that the ends of the lateral projections 20 will bear with sufficient force upon the inner surface of the outer tube to hold the telescoping member in any position into which it may have been placed.

At the upper end of the telescoping rod 18 there is provided a head or knob 21, which is transversely drilled to receive a bar 22, which bar acts as a stop when the apparatus is being used.

The outer surface of the telescoping rod 18 is provided with marks, lines, and figures 23, which indicia may be divisions or fractions of an inch, or fractions of a meter, which indicia are read when even with the upper surface of the socket 13. Thus, as shown in Fig. 2, the rod indicates that the distance from the base E of the instrument to the under side of the bar 22 measures 4 feet, while the upper end of the telescoping rod is marked 2 ft. 6 inches, thus indicating that when rod 18 has been pushed into the tube 12 as far as it will go, this mark 2 ft. 6 inches is even with the upper surface of the socket 13, and the distance between the base E and the bar 22 is 2 ft. 6 in., and when pulled out to within a reasonable distance from its lower end and still be sufficiently guided within the tube, would be approximately 4 ft. 6 in., leaving about 6 inches of the graduated rod within the tube. But since it is desirable that this instrument be capable of measuring the tallest person, I provide a second graduated rod of a length approximately 4 ft. 6 inches, and when this rod is pushed into the tube as far as it can go, the upper edge of the tube-socket will coincide with a mark indicating 4 ft. 6 inches, and when pulled out of the tube a distance of 2 ft. 2 inches, will indicate 6 ft. 8 inches, which is probably the extreme height of a person that will be measured, or at least sufficient for all practical purposes. It will thus be noted that with a single tube and two graduated rods of different length, I can measure a small child as well as the tallest person, by simply changing graduated rods. But, if desired, two complete measuring devices, one for the smaller persons, and the other for the taller individuals may be provided and attached to the standard of the weighing scales, as illustrated in Fig. 1.

The projections 20 at the lower end of the index rod prevent this rod from being entirely withdrawn from the outer tube; but by forcing the lower, split, ends toward each other, which can be readily accomplished by pulling the index rod as far as it will go, and then tilting the rod to compress the lower end, the rod can be entirely removed from the tube and a different index rod inserted; and to facilitate this insertion, the bore at the upper end of the tube 12 is beveled as at 24, Fig. 6, so that the normally extended projections 20 can contract to enter the tube 12.

While this measuring device is especially well adapted for use in connection with weighing scales by being attached to the standard of the scales, the instrument may be supported upon a comparatively long base E, having a socket 25, to receive the outer tube 12, as shown in Fig. 2, so that the device may be placed anywhere upon a floor and be ready for instantaneous use.

Attention is now invited to the fact that the combined weighing scales and measuring device are especially well adapted for use in the public schools and other educational institutions for weighing and measuring school children, and that the construction disclosed is such that mischievously inclined children cannot meddle with the device by pulling the index rod out of the casing and hiding the rod or carrying it away. Another advantage of this device resides in the fact that the index rod is both, slidably and rotatably mounted in the outer casing, so that the index rod can be revolved to move the transverse bar at the upper end thereof out of the way when a person steps upon the platform or base of the apparatus.

In use, the index rod is pulled outwardly as far as necessary and the person to be measured placed upon the platform E, and then the index rod lowered until the bar 22 touches the crown of the person's head, when the mark read by sighting over the upper surface of the socket 13, will indicate the exact height of the person measured.

Having thus fully described this invention, I claim as new, and desire to secure to myself by Letters Patent of the United States—

1. A measuring device of the nature described, comprising, in combination, a base, an outer tubular casing rising from and supported on the base, a socket at the upper end of said casing, said socket having an annular recess, affording a shoulder in said socket, an index rod constructed to telescopically and rotatably move in said tubular casing, the lower end of said index rod being longitudinally slitted, the terminals of said slitted portions being outwardly bent to afford stops, the slitted portions of said index rod being resilient, and an arm extending substantially horizontally from the upper end of the index rod.

2. In a device of the kind described, the combination with a base having a vertically disposed socket, of a tubular casing secured in said socket, a socket at the upper end of said casing, said socket having an annular recess affording a shoulder within said upper socket, an index rod constructed to telescope into said tubular casing, the lower end of said index rod being resilient, the terminals of said resilient portion being outwardly bent to afford stops, for engagement with said shoulder, and an arm extending substantially horizontally from the upper end of the index rod.

3. In a device of the kind described, a base, a tubular casing rising from the base, an index rod telescopically mounted on the casing, the upper end of the casing and the lower end of the rod formed for longitudinal engagement to prevent the easy separation of the rod from the casing, and a laterally extending arm on the upper end of the rod.

4. In a device of the kind described, a base, a tubular casing rising from and supported on the base, an index rod telescopically mounted in the casing, a shoulder on the upper end of the casing, the lower end of the rod formed with lateral projections for engaging said shoulder to prevent the easy separation of the rod from the casing, and a laterally extending arm on the upper end of the rod.

5. In a device of the kind described, a base, a tubular casing rising from the base, an index rod telescopically mounted in the casing, an internal shoulder on the upper end of the casing, lateral projections on the lower end of the rod for engagement with said shoulder to prevent the easy separation of the rod from the casing, the lower end of the rod being collapsible laterally to permit the projections to pass the shoulder for the removal of the rod from the casing, and a contact member extending out from the upper end of the rod substantially as described.

In testimony that I claim the foregoing as my invention, I have hereunto set my hand.

MATHIAS J. WEBER.